Nov. 22, 1960    G. W. JOHNSON    2,961,057
STEERING SYSTEM FOR TRACK-TYPE TRACTORS
Filed Aug. 5, 1959    4 Sheets-Sheet 1

INVENTOR.
GORDON W. JOHNSON
BY
Fryer and Johnson
ATTORNEYS

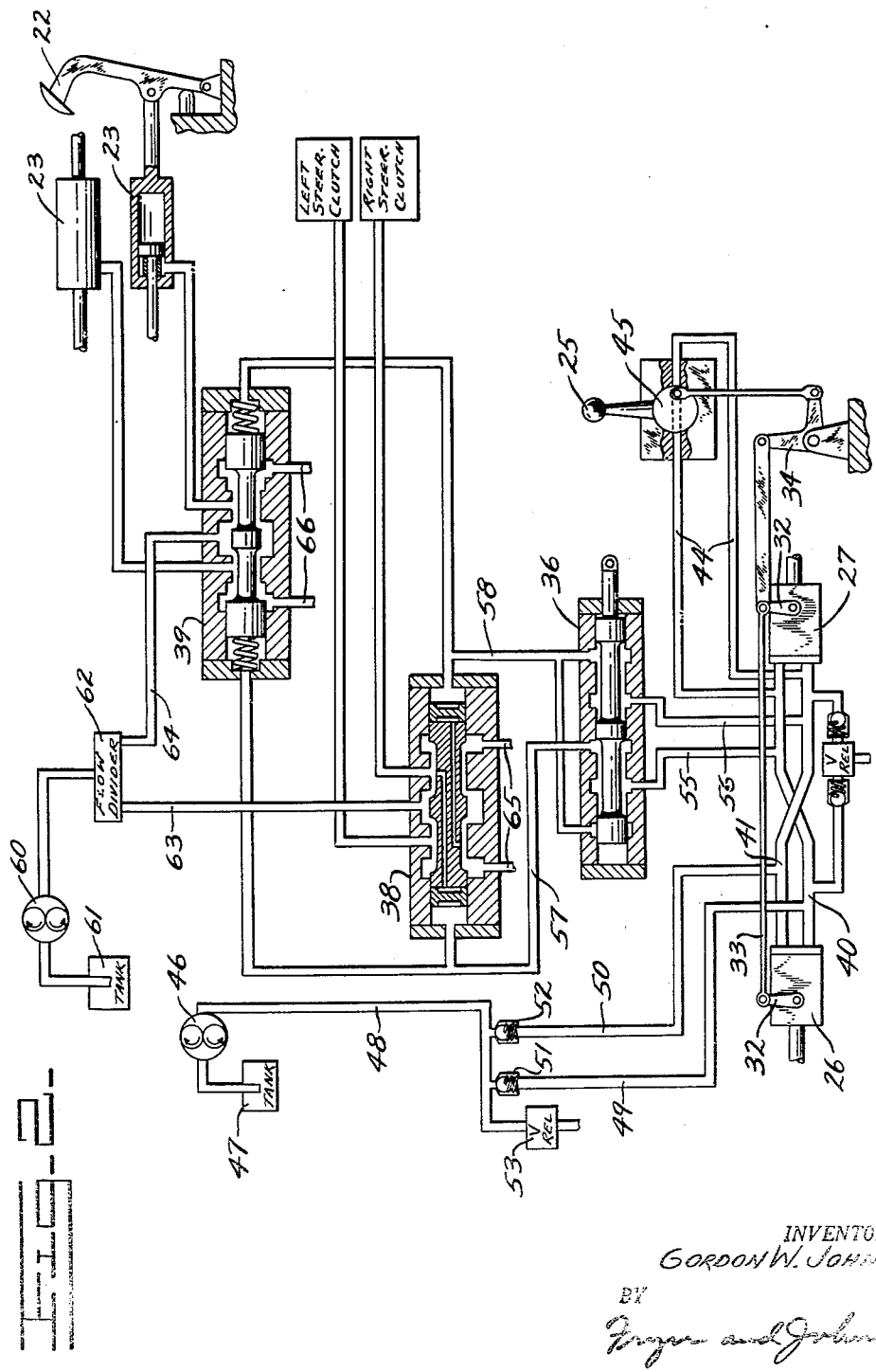

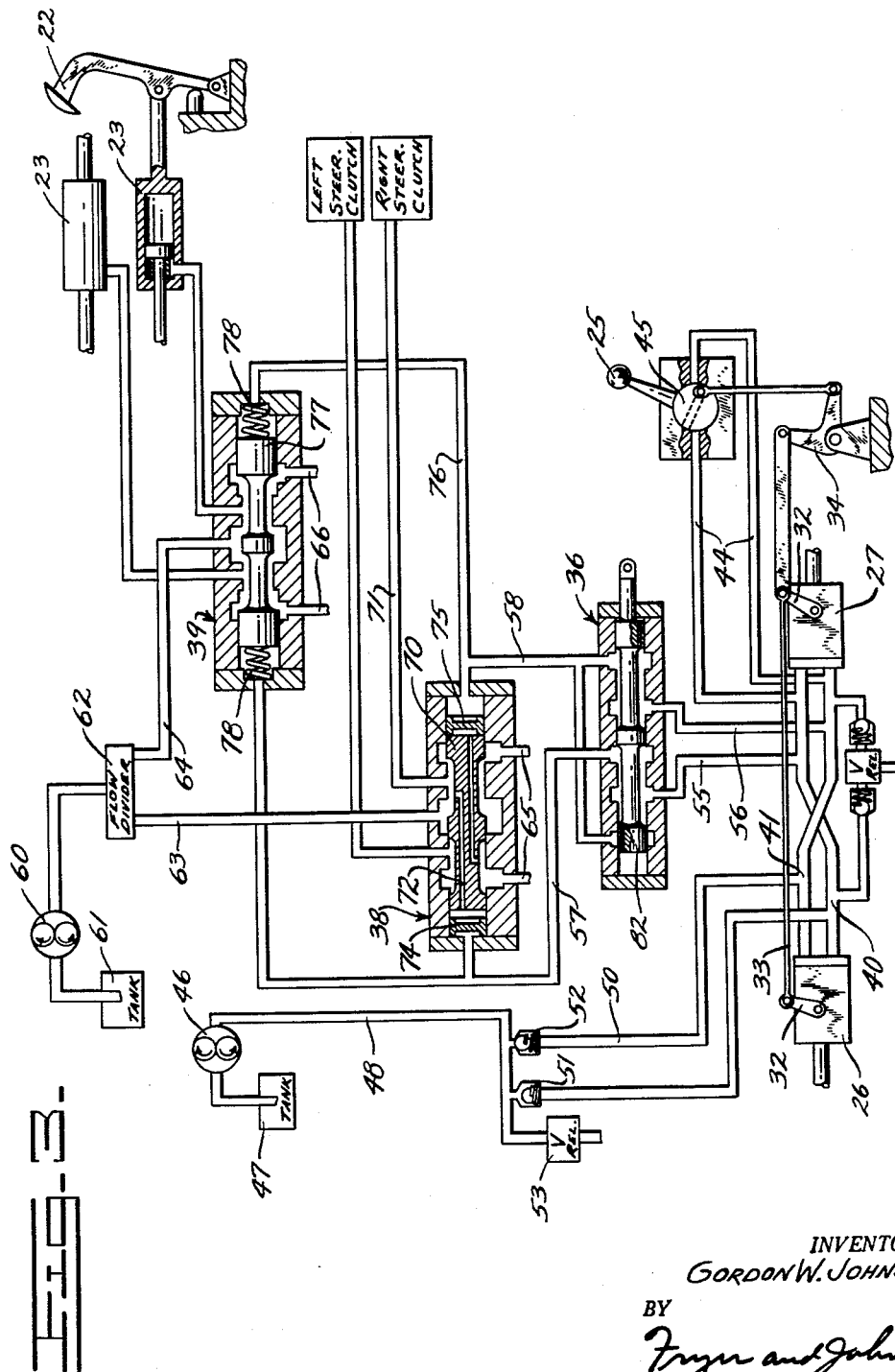

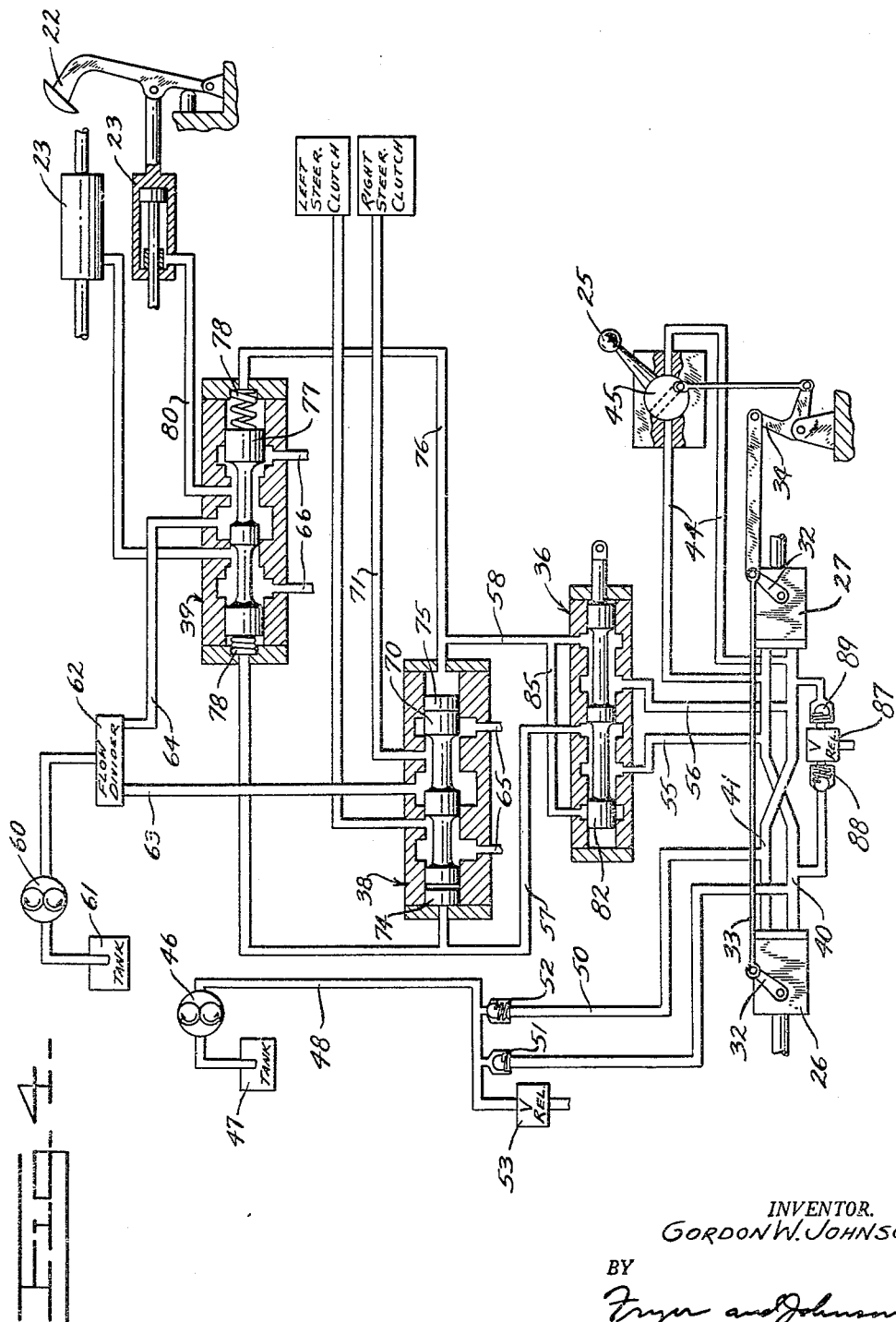

United States Patent Office 2,961,057
Patented Nov. 22, 1960

2,961,057

STEERING SYSTEM FOR TRACK-TYPE TRACTORS

Gordon W. Johnson, Peoria, Ill., assignor to Caterpillar Tractor Co., Peoria, Ill., a corporation of California Filed Aug. 5, 1959, Ser. No. 831,829

7 Claims. (Cl. 180—6.2)

This invention relates to steering of track-type tractors and particularly to a system which includes hydraulic means for effecting steering through the conventional clutch and brake steering mechanism of a track-type tractor.

The conventional method of steering track-type or crawler tractors sometimes referred to as "steering by driving," and employing separate clutches and brakes, in the final drive train which transmits power from the engine to the two sprockets for driving the tracks on the opposite sides of the tractor, has proven the simplest and most trouble-free method of steering. This method, however, has the disadvantages that it effects steering in an intermittent or jerky fashion and does not provide power to the track on the inner radius of a turn. It also requires both of the operator's hands and feet to execute a zig-zag or S-type turn and causes excessive wear on the brake linings because of frequent inability of an operator properly to synchronize the disengagement of the clutch and application of the brake. A further disadvantage is that the system operates in reverse during down-hill or coasting movement of a tractor so that the operator must remember to actuate the left hand steering lever to make a right hand turn when certain conditions prevail.

It is the object of the present invention to provide an improved system for steering a track-type tractor in which a single operator's lever is effective upon movement to left or right to effect steering of the tractor in corresponding directions under all conditions of travel. A further object is to provide a system of this kind in which the vehicle is steerable during downhill travel without a reversal of the normal steering procedure.

A further object of the invention is to provide a system of steering by driving in which automatic controls prevent application of a steering brake until after the corresponding steering clutch is fully disengaged.

A still further object is the provision of a system which effects infinitely variable steering or gradual steering rather than the usual jerky steering of the conventional steering by driving system and to provide a system which is readily adaptable to existing types of machines with conventional steering clutches and steering brakes.

Further and more specific objects and advantages of the invention reside in the construction and arrangement of its various components and are made apparent in the following specification wherein the invention is described in detail by reference to the accompanying drawings.

In the drawings:

Fig. 2 is a fluid circuit diagram indicating the condition of the circuit for straight forward travel;

Fig. 3 is a similar diagram indicating the condition of the circuit during a controlled radius right turn; and Fig. 4 is a similar view illustrating the condition of the circuits for a right pivot turn.

Figure 1:
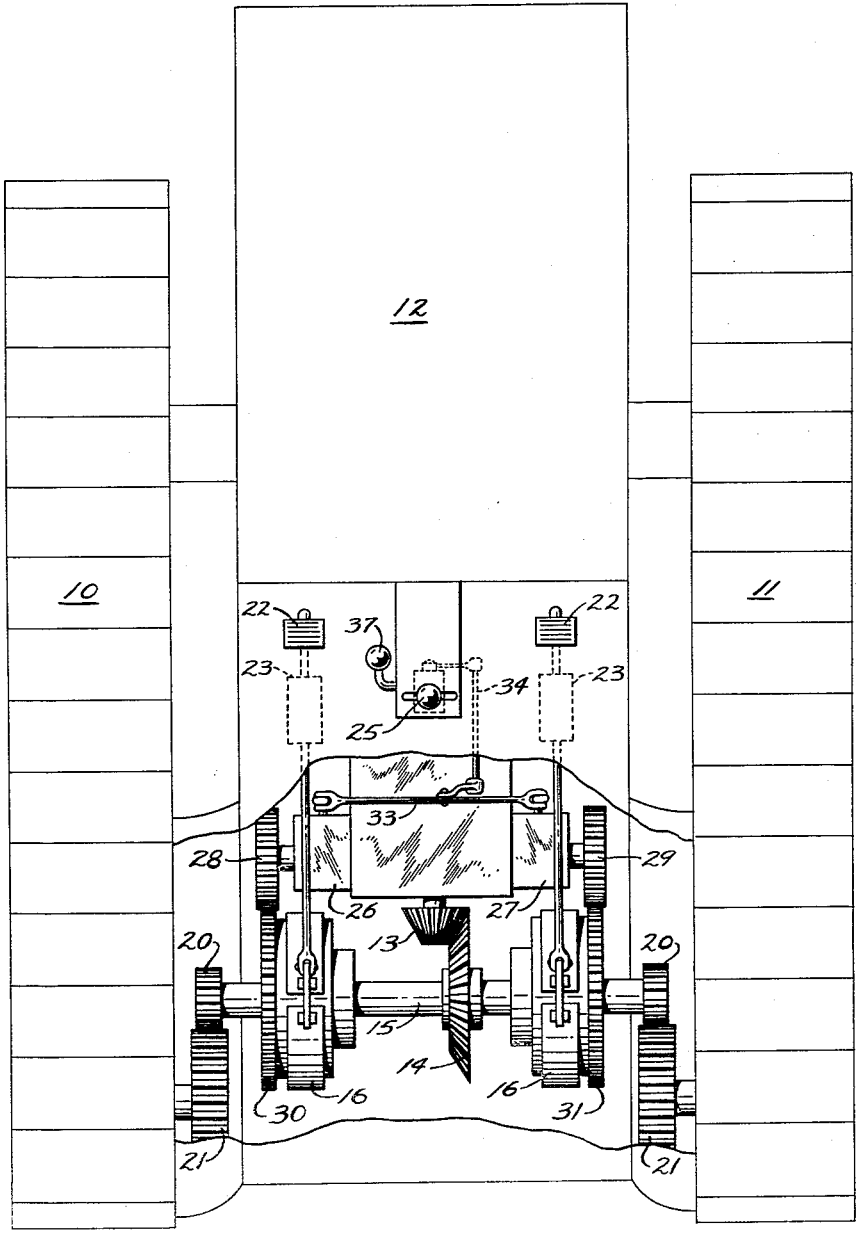
Fig. 1 is a schematic plan view of a track-type tractor with parts broken away and the positions of the various components of the present invention schematically illustrated.

The tractor which is schematically illustrated in Fig. 1 has conventional tracks represented at 10 and 11 and a compartment 12 for an engine (not shown) which through conventional transmission means and the main clutch (not shown) imparts power through bevel gears 13 and 14 to the transfer shaft 15 which has a combination steering clutch and brake 16 at each end to transmit and interrupt the application of power through gears 20 and 21 on opposite sides of the tractor through the sprockets (not shown) which drive the tracks 10 and 11 and thereby enable selective driving and stopping of the tracks 10 and 11 to accomplish steering.

The steering brakes are actuated by conventional pedals as shown at 22, one of which is also illustrated in Fig. 2, each through linkage which includes a hydraulic brake booster cylinder 23. The present invention utilizes the brake cylinders in conjunction with a hydraulic circuit schematically illustrated in Fig. 2 for actuating the brakes as well as the steering clutches through manipulation of a single steering lever illustrated at 25.

The hydraulic circuit includes variable displacement pumps 26 and 27 which are of a commercially available type and which are driven as shown in Fig. 1 by gears 28 and 29, respectively, which mesh with ring gears 30 and 31 formed on a driven part of the steering clutches so that the speed of operation of the pumps 26 and 27 corresponds to the relative speeds of the tracks 10 and 11. The displacement of the pumps 26 and 27 at any given speed is variable and is adjustable by means of levers 32 one on each of the pumps which are connected together as by a link 33 and connected with the control lever 25 by any suitable linkage such as illustrated at 34. The pumps are mounted in opposed positions so that upon swinging of the control lever 25 in one direction, the displacement or output of one pump is increased while that of the other is correspondingly decreased. A spool type reversing valve 36 in the system is actuated through linkage not shown by a suitable lever 37 shown in Fig. 1 positioned adjacent the control lever 25 and which is preferably also the reverse lever of the tractor transmission. The circuit also includes a clutch control valve 38 and a brake control valve 39, the function of which will be made apparent.

Conduits 40 and 41 communicate between the pumps 26 and 27, each conduit extending from the output of one pump to the intake opening of the other pump so that with the pumps operating at the same speed as during straight forward travel of the tractor, they perform no function but merely circulate hydraulic fluid through each other by way of the lines 40 and 41. Upon adjustment of the control lever 25, however, either to the left or to the right to increase the output of one pump and decrease the output of the other, the pump having the greater displacement will pump a volume of fluid greater than that which will pass through the other pump causing an increase in pressure in one of the lines 40 or 41. This is employed as a pilot pressure or valve actuating pressure to adjust the positions of the clutch control valve 38 and the brake control valve 39. To insure the balanced condition of pressure in the lines 40 and 41 when the tractor is traveling on a straight course, against any slight pressure rise which might occur for example due to differences in displacement or efficiency of the pumps, a bypass line 44 communicates between the lines 40 and 41 and includes a valve 45 formed as part of the control lever 25 and open when the control lever is in its vertical or straight ahead position but closed when it is swung either to right or left for steering purposes. Thus any slight difference in pressure in the lines 40 and 41 is equalized except during steering.

Fig. 2 illustrates the various components in the hydraulic circuit in the positions which they occupy during straight forward travel. With the parts in these positions, operating fluid for the pumps 26 and 27 is being supplied by an engine driven pump 46 from a supply tank 47. This fluid is directed through a line 48 and lines 49 and 50 to the conduits 40 and 41, respectively, and spring loaded check valves 51 and 52 are provided in these lines. When the circulating system, including the pumps 26, 27 and their communicating lines is full, a relief valve 53 permits escape of the excess fluid delivered by the pump 46 and it may be directed back to the tank 47. Each of the conduits 40 and 41 is connected as by lines 55 and 56 through the reversing valve 36 with conduits 57 and 58 which direct pressure from the circulating system to opposite ends of both a clutch control valve 38 and the brake control valve 39. Since in the straight forward travel position the pressure in the lines 40 and 41 is equal, the valves 38 and 39 remain in a neutral or central position wherein there is no effect upon the steering clutches or brakes. Hydraulic fluid for actuating these brakes and clutches is directed to the valves 38 and 39 by a second engine driven pump 60 taking fluid from a supply tank 61 and directing it through a flow divider 62 and lines 63 and 64 to the valves 38 and 39, respectively. In the central or neutral positions of these valves, the fluid from the pump 60 passes freely through them into discharge lines shown at 65 and 66 by means of which it may be returned to the tank 61.

An abrupt turn of a tractor executed by means of stopping one track completely while the other is in motion is referred to as a pivot turn and any turn less abrupt than a pivot turn where both tracks are moving at different speeds may be referred to as a controlled radius turn. Since these two types of turns require somewhat different functioning of the components of the hydraulic circuit, each is described separately herein.

Fig. 3 illustrates the position of the parts during the execution of a forward right controlled radius turn. In this figure, the control lever 25 has been moved to the right to increase the displacement of pump 27 and decrease the displacement of the pump 26 which results in an increase in pressure in line 41. The bypass 44 between lines 40 and 41 has been closed by actuation of the valve 45 through the lever 25. Fluid from pump 46 may now pass through check valve 51 and fluid under high pressure in line 41 is transmitted through line 56, reversing valve 36 and line 58 to the clutch control valve 38 and moves a spool 70 therein to the right so that fluid under pressure from the pump 60 entering the valve through line 63 is directed into a line 71 to the right steering clutch to effect partial disengagement or slippage of the clutch thereby reducing the speed of the right track to effect turning of the tractor. The steering clutches are of a well known type which is spring loaded and hydraulically disengaged and a disclosure of their specific construction is not necessary to an understanding of the present invention. Fluid under pressure entering through line 63 also passes through a passage 72 in the spool 70 to act against the end opposite the line 58 in order to counterbalance the pressure from the line 58 and hold the spool in a stationary operating position which depends upon the degree of movement of the control lever 25. The spool 70 does not completely close one of the drain ports 65 so that a portion of the fluid entering through line 63 is discharged therethrough in a quantity which depends upon the pressure entering through line 58. Thus the pressure of the high volume fluid in line 71 always corresponds to the pilot pressure in line 58 which is determined by the position of the control lever. For example if the pressure tends to become too great in line 71, it is exerted against the left hand end of the spool thereby causing greater opening of the right hand discharge port 65 which tends to reduce the pressure in line 71. Intermixing of pressure in the pilot system originating with the pump 46 and in the operating system originating with the pump 60 can not take place in the clutch control valve because of a pair of floating pistons 74 and 75 disposed at opposite ends of the spool 70.

In the controlled radius turn the pressure in line 58 is communicated through a line 76 to one end of the brake control valve 39, but a spool 77 in this valve is normally held in a substantially centered position by springs 78 at its opposite ends which prevent only limited movement of the spool 77 under the low pressure which is created in the pilot system during a controlled radius turn.

A forward right pivot turn may be understood by reference to Fig. 4 where the control lever 25 has been moved to its right hand limit of movement affecting adjustment of pump 27 to a position of maximum displacement and the pump 26 to a position slightly beyond zero displacement so that the operation of pump 26 is actually reversed and it is directing pressure into line 41 and line 56. This is necessary because as the brake is applied to stop the right track for a right pivot turn the pump 27, which is driven, as shown in Fig. 1, by the right track operating mechanism, will come to rest and prevent flow of fluid between lines 40 and 41. In this condition, the high pressure in line 56 which is transmitted to the brake control valve through lines 58 and 76 attains a value exceeding the force of the spring 78 and moves the spool 77 toward the left as shown in Fig. 4 providing communication of fluid under pressure from pump 60 through the brake control valve to a line 80 which communicates with the brake booster 23 for the right brake to apply the brake which stops the right hand track. Meanwhile the right steering clutch has been fully disengaged by the high pilot pressure in the clutch control valve 38 acting in the same manner as described in connection with the controlled radius turn but moving the spool 70 a greater distance to effect delivery of greater pressure to the right steering clutch. If a turn just slightly less than a fully pivot turn is desired, it may be accomplished by momentarily slipping the brake just slightly through manipulation of the control lever 25.

When the tractor is operating in reverse, the pumps 26 and 27 will be driven in reverse thus effecting an interchange of a high and low pressure condition of conduits 40 and 41. To compensate for this, the reversing valve 36 is actuated by the lever 37 shown in Fig. 1, which is preferably also the reversing lever of the main tractor transmission, and connected with the reversing valve spool 82 by suitable linkage not shown. In the reverse position, the spool 82 is moved to the left and the high pressure now in line 55 will be directed through line 58 by way of a cross-over or bypass line 85 so that with the pumps 26 and 27 operating in a reverse direction, operation of the control lever 25 will direct fluid to the same end of the valves 38 and 39 as before. With this arrangement a reverse turn in one direction can be executed after a forward turn in the same direction by merely shifting the forward and reverse lever 37 without the necessity of manipulating the control lever 25.

Excessive pressures in the pilot circuit which might build up for example during a pivot turn may be relieved by a relief valve 87 which is in communication through check valves 88 and 89 with the conduits 40 and 41, respectively. The complete operation of the system during the execution of left turns will be evident from the foregoing description of the right turn operations.

I claim:

1. A steering system for a track-type tractor which has a separate hydraulically releasable clutch for each track comprising, a variable displacement pump driven by the track drive mechanism on the driven side of each clutch, conduits connecting the intake of each pump with the outlet of the other for circulation of fluid between the pumps, a control member connected to the pumps to increase the displacement of either while decreasing the displacement of the other to selectively increase the pressure in one of said conduits, a pressure actuated valve operable in two directions for selective disengagement of said clutches, and means connecting said conduits to said valve whereby increased pressure in either of said conduits will actuate said valve in one of said two directions and increased pressure in the other conduit will actuate the valve in the opposite direction.

2. A steering system for a track-type tractor which has a separate hydraulically releasable clutch for each track comprising, a variable displacement pump driven by the track drive mechanism on the driven side of each clutch, conduits connecting the intake of each pump with the outlet of the other for circulation of fluid between the pumps, a control member connected to the pumps to increase the displacement of either while decreasing the displacement of the other to selectively increase the pressure in one of said conduits, a pressure actuated valve operable in two directions for selective disengagement of said clutches, and means connecting said conduits to said valve whereby increased pressure in either of said conduits will actuate said valve in one of said two directions and increased pressure in the other conduit will actuate the valve in the opposite direction and a reversing valve between said conduits and said pressure actuated valve to reverse the flow to said valve when the tractor is operating in reverse.

3. A steering system for a track-type tractor which has a separate hydraulically releasable clutch and a separate hydraulically actuated brake in the drive mechanism for each track, a variable displacement pump driven by the track drive mechanism on the driven side of each clutch and brake, conduits connecting the intake of each pump with the outlet of the other for circulation of fluid between the pump, a control member connected to both pumps to increase the displacement of one while decreasing the displacement of the other to selectively increase the pressure in one of said conduits, a pressure actuated valve operable in two directions for selective disengagement of said clutches, a pressure actuated valve operable in two directions for selective application of said brakes, and means connecting said conduits to said valves whereby increased pressure in either of said conduits will actuate said valves in one of said two directions and increased pressure in the other conduit will actuate the valves in the opposite direction.

4. A steering system for a track-type tractor which has a separate hydraulically releasable clutch and a separate hydraulically actuated brake in the drive mechanism for each track, a variable displacement pump driven by the track drive mechanism on the driven side of each clutch and brake, conduits connecting the intake of each pump with the outlet of the other for circulation of fluid between the pumps, a control member connected to both pumps to increase the displacement of one while decreasing the displacement of the other to selectively increase the pressure in one of said conduits, a pressure actuated valve operable in two directions for selective disengagement of said clutches, a pressure actuated valve operable in two directions for selective application of said brakes, means connecting said conduits to said valves whereby increased pressure in either of said conduits will actuate said valves in one of said two directions and increased pressure in the other conduit will actuate said valves in the opposite direction, and resilient means resisting actuation of the brake operating valve whereby greater pressure in said conduits is required to apply a brake than to release a clutch.

5. A steering system for a track-type tractor which has a separate hydraulically releasable clutch and a separate hydraulically actuated brake in the drive mechanism for each track, a variable displacement pump driven by the track drive mechanism on the driven side of each clutch and brake, conduits connecting the intake of each pump with the outlet of the other for circulation of fluid between the pumps, a control member connected to both pumps to increase the displacement of one while decreasing the displacement of the other to selectively increase the pressure in one of said conduits, a pressure actuated valve operable in two directions for selective disengagement of said clutches, a pressure actuated valve operable in two directions for selective application of said brakes, and means connecting said conduits to said valves whereby increased pressure in either of said conduits will actuate said valves in one of said two directions and increased pressure in the other conduit will actuate said valves in the opposite direction, and a reversing valve between said conduits and said clutch and brake valves to reverse the flow to said valves when the tractor is operating in reverse.

6. In a track-type tractor having steering clutches and steering brakes all hydraulically actuated, a two-way pressure actuated valve for selectively directing fluid under pressure to release the clutches, a two-way pressure actuated valve for directing fluid under pressure to apply the brakes, and means for directing actuating pressure to said valves comprising two variable displacement pumps driven one with each of the tractor tracks, conduits connecting the discharge of each pump with the intake of the other, means to vary the displacement of the pumps to increase pressure selectively in said conduits, and means connecting the conduits one to each end of said two-way valves.

7. In a track-type tractor having steering clutches and steering brakes all hydraulically actuated, a two-way pressure actuated valve for selectively directing fluid under pressure to release the clutches, a two-way pressure actuated valve for directing fluid under pressure to apply the brakes, means for directing actuating pressure to said valves comprising two variable displacement pumps driven one with each of the tractor tracks, conduits connecting the discharge of each pump with the intake of the other, a control lever connected with said pumps and movable in two directions from a neutral position to increase the displacement in one or the other of said pumps, means connecting the conduits one to each end of said two-way valves, a bypass between said two conduits, and a normally open valve in said bypass closed by movement of said control lever in either direction from neutral.

No references cited.